May 13, 1952 A. BLACKMAN 2,596,119
MASTER CYLINDER STRUCTURE FOR HYDRAULIC BRAKE SYSTEMS
Filed Dec. 14, 1950 5 Sheets-Sheet 1
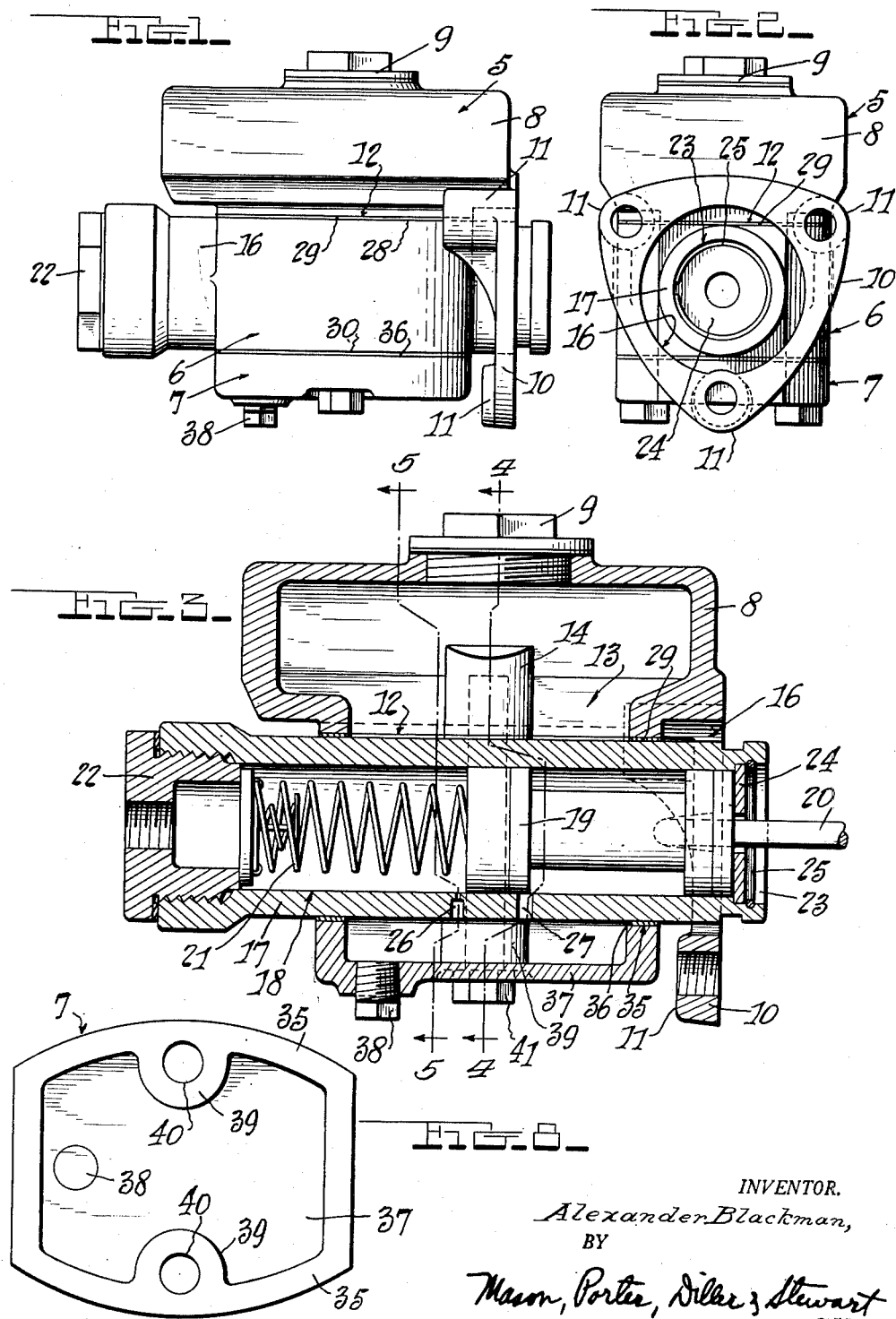
INVENTOR.
Alexander Blackman,
BY
Mason, Porter, Diller & Stewart
attys.

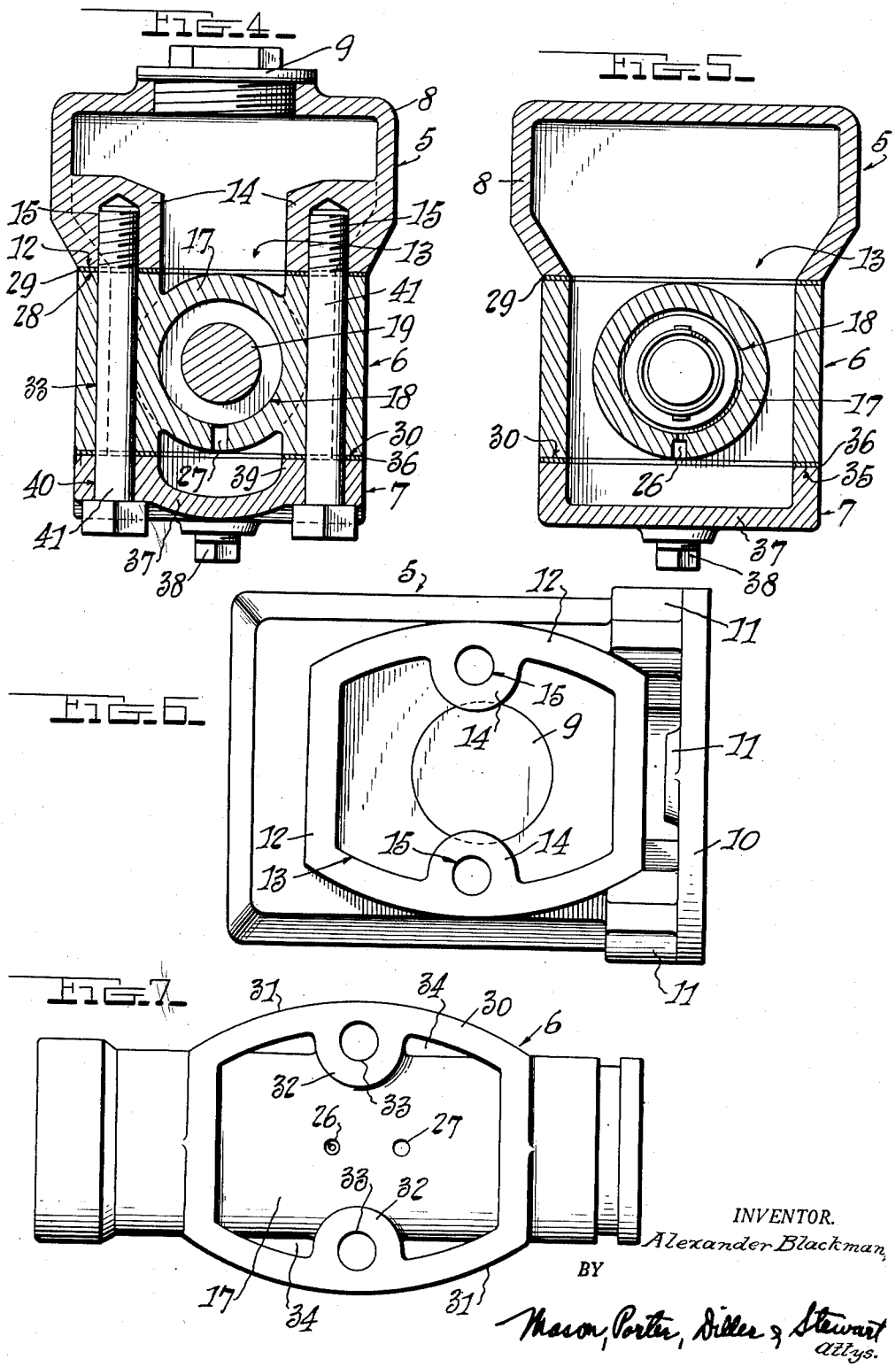

May 13, 1952 A. BLACKMAN 2,596,119
MASTER CYLINDER STRUCTURE FOR HYDRAULIC BRAKE SYSTEMS
Filed Dec. 14, 1950 5 Sheets-Sheet 3
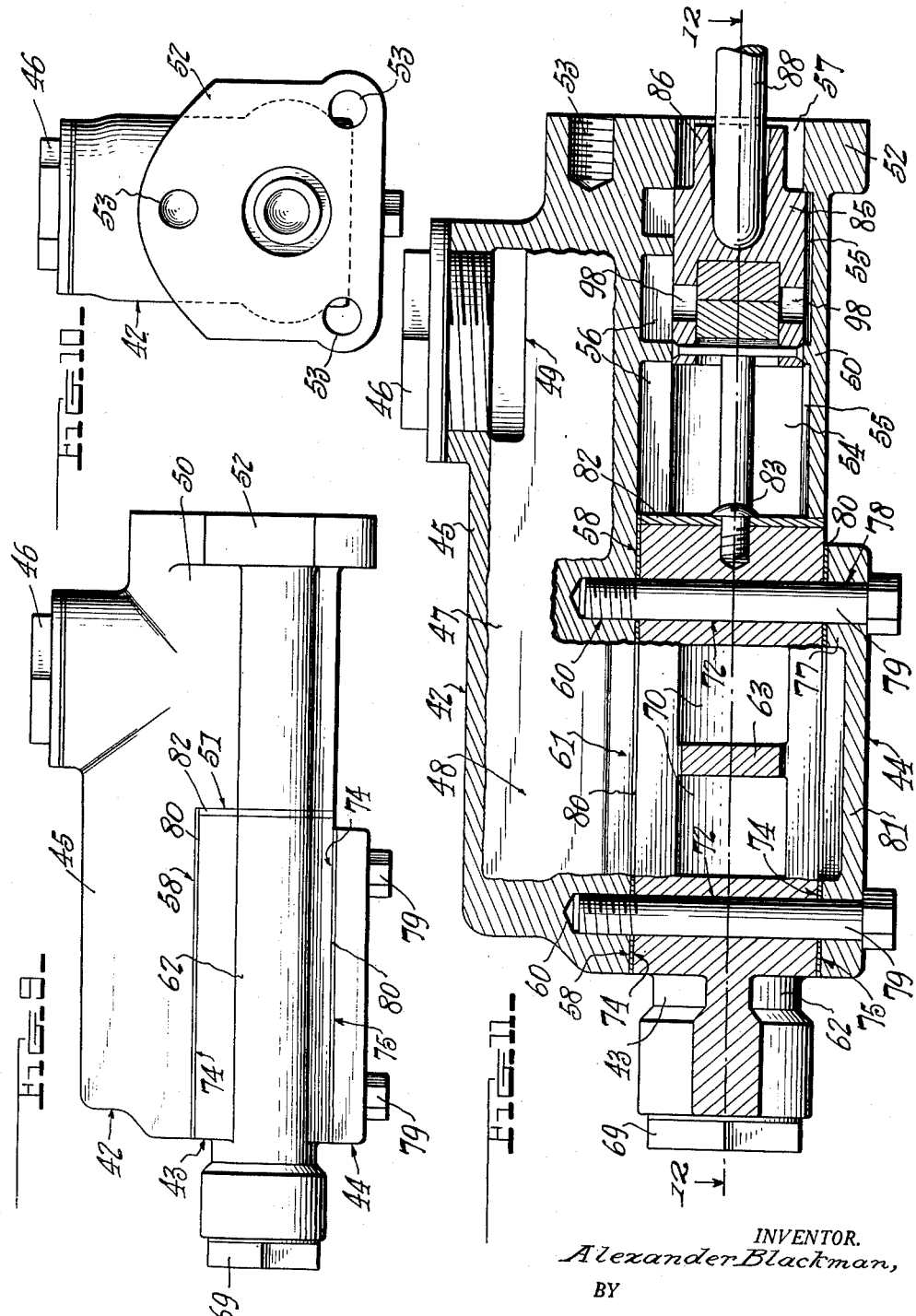
INVENTOR.
Alexander Blackman,
BY
Mason, Porter, Diller & Stewart
attys.

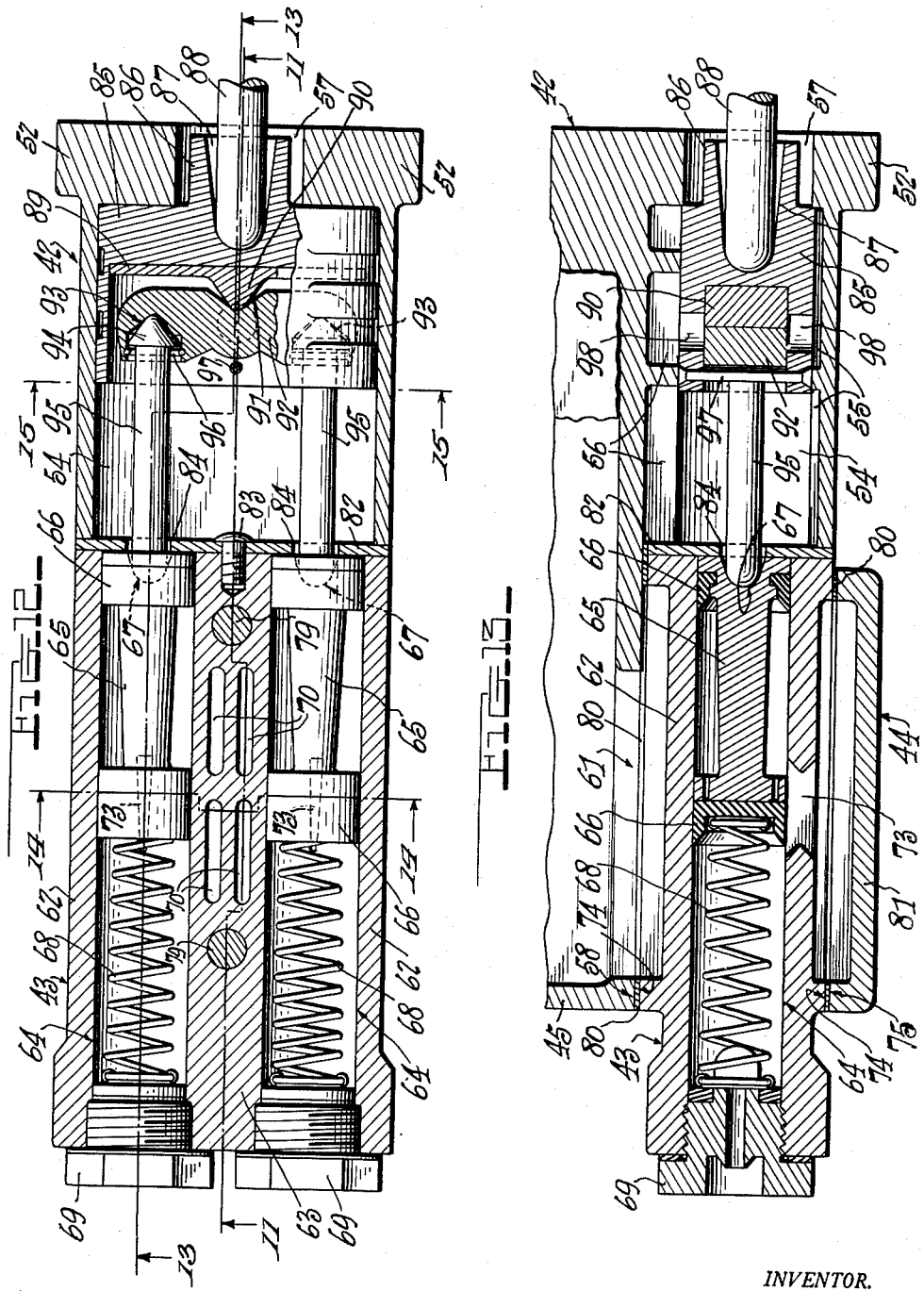

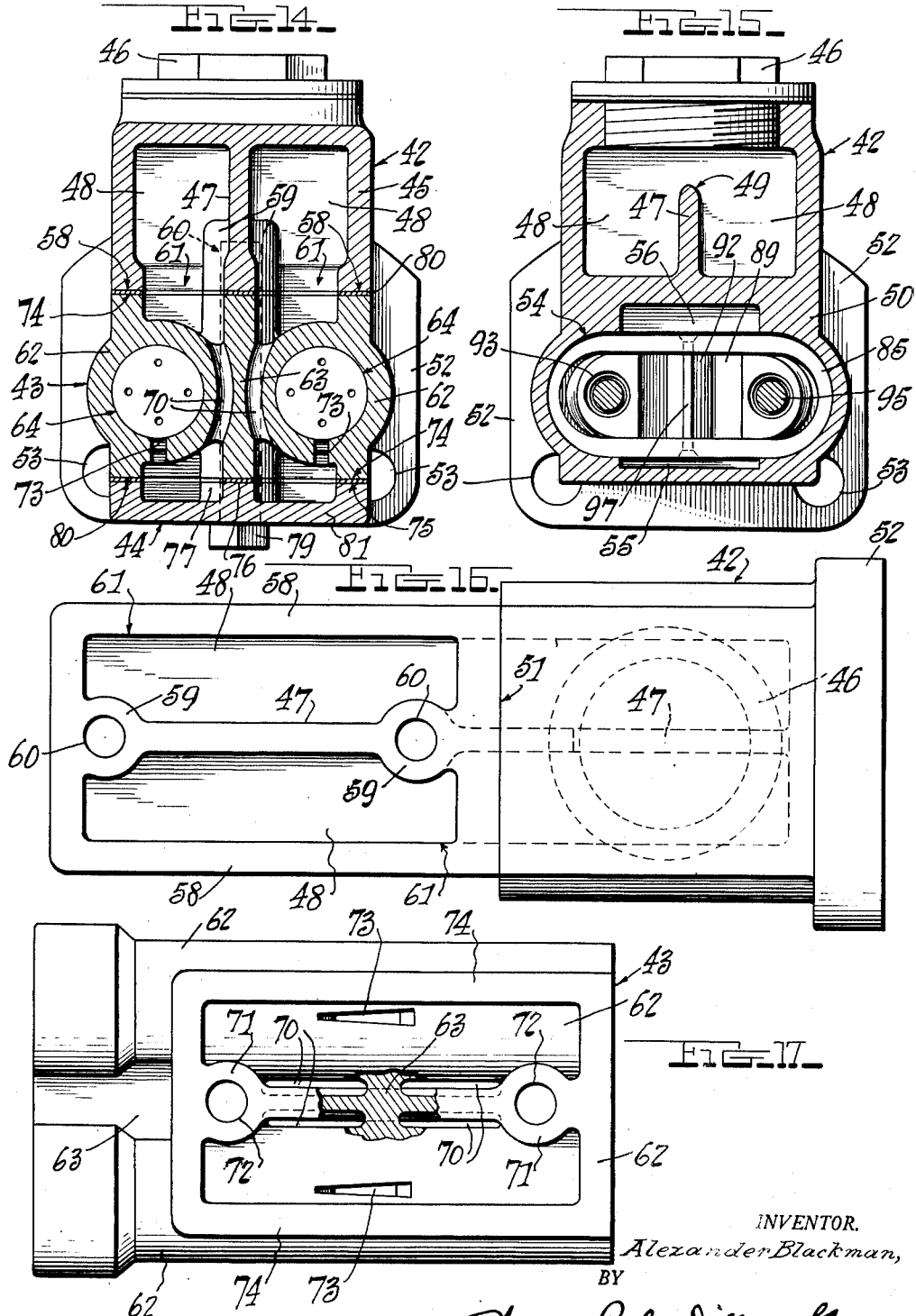

Patented May 13, 1952

2,596,119

UNITED STATES PATENT OFFICE 2,596,119

MASTER CYLINDER STRUCTURE FOR HYDRAULIC BRAKE SYSTEMS

Alexander Blackman, New Orleans, La., assignor of one-half to Joseph C. Hare, New Orleans, La.

Application December 14, 1950, Serial No. 200,797

16 Claims. (Cl. 60—54.6)

The invention relates generally to hydraulic brake systems and primarily seeks to provide a novel master cylinder structure for use in such systems which is simple in construction and subject to being manufactured economically, and which includes a novel cylinder unit and mounting means which make it a simple matter to remove the cylinder unit for overhauling or replacement purposes.

It is well known that the now commonly used master cylinder structures frequently must be discarded in toto simply because of wearing or scoring of the cylinder bore. Also, known structures have proven somewhat objectionable because of the difficulties attending dismounting of the brake cylinder structures for repair purposes. Another difficulty experienced in the use of conventional structures results from the falling of bits of foreign matter into the cylinder bore through the inlet and release ports, and the scoring of the cylinder walls by bits of foreign matter collected in the cylinder in this manner or by reason of breaking away from working parts in the cylinder. It is a purpose of the present invention to provide a novel master cylinder structure in which all of these objectionable features and difficulties are eliminated.

In its more detailed nature the invention seeks to provide a novel simple and inexpensively manufactured master cylinder structure formed of metal cast in three pieces readily assembled and disassembled and securely held in assembly by two screws, said structure comprising a top main reservoir body piece or unit having an integral mounting bracket extension, an intermediate cylinder piece or unit, and a bottom sediment catching piece or unit, means being provided for maintaining communication between the interior of the reservoir body and the bottom unit, and the inlet and release ports opening into said bottom unit through the bottom of the cylinder thereby to provide for clearing of bits of foreign matter from the cylinder and the prevention of the falling of such matter into the cylinder through such ports.

Another object of the invention is to provide a master cylinder structure of the character stated wherein the intermediate cylinder unit includes twin cylinders served by a common top or reservoir unit and a common bottom or sediment collecting unit.

Another object of the invention is to provide a master cylinder structure of the character stated wherein the reservoir body and the sediment collecting unit are so formed as to provide individual reservoir and sediment collecting chambers for the individual cylinders.

Another object of the invention is to provide a master cylinder structure of the character stated wherein the top main reservoir body unit not only includes a mounting bracket extension but also a piston actuator guide extension disposed for end alignment and abutment with the cylinder means of the intermediate cylinder unit.

Another object of the invention is to provide a master cylinder structure of the character stated wherein pistons are reciprocably mounted in the twin cylinders, and actuating means are reciprocable in the guide extension and comprise a cup-like pusher head, a fulcrum plate in the bottom of said head and having a fulcrum rib, an equalizer bar rockably mounted in the head and having a V-groove rockably engaging the rib, and thrust pins connected with the free ends of the equalizer bar in parallel relation and extending into the cylinders axially and engaged with the ends of the pistons therein.

With the above and other objects in view that will hereinafter appear, the nature of the invention will be more clearly understood by reference to the following detailed description, the appended claims and the several views illustrated in the accompanying drawing.

In the drawings:

Figure 1 is a side elevation illustrating a master cylinder structure embodying the invention and including a single cylinder.

Figure 2 is a right end elevation of the structure shown in Figure 1.

Figure 3 is a vertical central longitudinal section taken through the structure shown in Figure 1.

Figures 4 and 5 are vertical cross sections taken respectively on the lines 4—4 and 5—5 on Figure 3.

Figure 6 is a bottom plan view of the top main body or reservoir casting of the master cylinder structure of Figure 1.

Figure 7 is a bottom plan view of the central piece or cylinder casting of the master cylinder structure of Figure 1.

Figure 8 is a top plan view of the bottom piece or sediment catching casting of the master cylinder structure of Figure 1.

Figure 9 is a side elevation of a master cylinder structure embodying the invention and including a central piece or casting in which twin cylinders are formed.

Figure 10 is a right end elevation of the structure shown in Figure 9.

Figure 11 is a vertical longitudinal section taken on the line 11—11 on Figure 12.

Figure 12 is a horizontal section taken on the line 12—12 on Figure 11.

Figure 13 is a vertical longitudinal section taken on the line 13—13 on Figure 12.

Figures 14 and 15 are vertical cross sections taken respectively on the lines 14—14 and 15—15 on Figure 12.

Figure 16 is a bottom plan view of the top main body or reservoir casting of the master cylinder structure of Figure 9.

Figure 17 is a bottom plan view of the central piece or twin cylinder casting of the master cylinder structure of Figure 9.

In Figures 1 through 8 of the drawings there is disclosed a three-piece master cylinder structure embodying the invention in which a single cylinder is included. In this form of the invention, the master cylinder structure includes a top main body or reservoir piece or casting 5, a central piece or cylinder casting 6, and a bottom piece or sediment catching casting 7.

The piece 5 includes a generally rectangular reservoir body 8 having a threadably mounted large filler cap 9 in the top central wall thereof as illustrated in Figures 3 and 4 of the drawings. The casting piece 5 also includes a depending tri-cornered bracket 10 at one end thereof, an apertured boss 11 being provided at each corner of the bracket extension for receiving screws by which the whole master cylinder structure may be removably attached to a suitable support. It will be apparent by reference to Figures 1, 4 and 6 of the drawings that the casting piece 5 has a flat bottom face 12 with a central longitudinal opening 13 therethrough flanked by two enlargements or bosses 14 having threaded taps 15 in the underface thereof as indicated in Figures 4 and 6. It will also be noted that the bracket extension 10 has central opening 16 through which the cylinder of the master cylinder structure may project in the manner clearly illustrated in Figures 2 and 3.

The intermediate piece or casting unit includes a hollow cylinder 17 in the bore 18 of which the usual piston 19 is reciprocably mounted, said piston being reciprocated in the usual manner through the medium of actuating devices generally designated 20 and a return spring 21 interposed between the piston and a threadably mounted, apertured end plug 22.

The cylinder is counterbored at 23 at the end remote from the plug 22 to receive an apertured closure ring 24, the latter being removably held in place by a groove mounted snap ring 25.

Inlet and release ports 26 and 27 open through the bottom wall of the cylinder 17 in the manner clearly illustrated in Figures 3, 4 and 5, and it will be noted that the inlet port constitutes a small diameter bore opening downwardly into a larger counterbore. This manner of forming the inlet port provides a port of proper size and yet assures against clogging of the port because of the quick clearing effect of the enlargement or counterbore.

The intermediate unit or casting 6 has a flat top surface 28 which opposes the similarly shaped flat surface 12 of the top unit 5, a ring gasket 29 being interposed between said flat surfaces in the complete assembly. The unit 6 also has a flat bottom surface 30 for opposing a like shaped flat surface on the bottom casting or unit 7, and it is to be noted that the sides of the opposing flat surfaces are outwardly curved in the manner clearly illustrated in Figures 6, 7 and 8. Enlargements or bosses 32 are provided on the unit or casting 6, and these are bored as at 33 to receive the assembly securing screws. The outward bulging or curving of the sides of the unit 6 in the manner clearly illustrated in Figure 7 provides passages 34 at each side of the bosses 32 and at each side of the cylinder 16, thereby to provide communication between the main reservoir in the top unit or casting 5 and the bottom unit or casting 7 about the sides of the cylinder 16 in the manner clearly illustrated in Figures 4 and 5 of the drawings. The bottom casting or unit 7 includes a flat top surface 35 for opposing the like shaped bottom surface 30 of the intermediate unit, and in the final assembly of the structure a ring gasket 36 is interposed between the lower and intermediate units 7 and 6 in the manner clearly illustrated in Figures 1, 4 and 5 of the drawings. The bottom unit provides a bottom closure at 37, and this bottom closure wall is equipped with a sediment removing and draining vent plug 38.

As before stated, the flat top surface 35 of the bottom unit 7 conforms in shape to the opposing bottom surface of the intermediate unit, and the bottom unit is provided with enlargements or bosses 39 which are bored at 40 to receive the assembly securing screws 41. The two screws 41 hold the three parts of the master cylinder structure in assembly in the manner clearly illustrated in Figures 1, 2 and 4 of the drawings.

It will be readily apparent that should it become necessary to remove the cylinder 16 for overhauling or replacment, it is only necessary to remove the securing screws 41. This will permit removal of the bottom casting unit 7 and the cylinder unit casting 6 without disturbing the mounting of the main body or reservoir casting 8.

It will also be apparent that the brake fluid in the reservoir formed in the top casting 5, about the sides of the cylinder 16 in the intermediate unit 6 and in the bottom unit 7 enters and is released from the cylinder through the ports 26 and 27 in the bottom thereof. Thus it is impossible for bits of foreign matter to fall into the cylinder through said ports, usually provided in the top, and it is also possible for tiny particles which might break away from the working parts within the cylinder 16 to find egress through said ports into the sediment collecting chamber in the bottom unit 7. In this manner jamming and scoring of the piston in the cylinder is avoided and longevity of the cylinder is materially increased in addition to the facilitation of mounting and removal of this part for the purpose of overhauling and replacement.

In Figures 9 through 17 of the drawings, there is illustrated a master cylinder structure including twin cylinders. This form includes a top or main body reservoir casting 42, an intermediate casting 43, and a bottom piece or sediment catching casting 44.

The casting 42 shown in detail in Figure 16 includes a generally rectangular reservoir body 45 having a large filler cap 46 threadably mounted in the top wall thereof. The reservoir body is divided by a central partition wall 47 into two parallel, longitudinal chambers 48, said chambers being separated by the wall 47 except for the length of the partition directly beneath the filler cap 46, this portion of the partition being cut away as at 49 so that fluid poured in through the filler opening will be supplied to the reservoir spaces 48 at both sides of the partition.

The casting 42 has a depending body 50 at one end thereof terminating in a vertical wall 51 approximately at the transverse center of the casting. The body also is equipped at its other end with a mounting flange enlargement 52 having mounting screw receiving taps 53. The body 50 also has a piston actuator device receiving slide chamber 54 therein, bottom clearance 55 and top clearance 56, and opening through the end wall 51 full width, and at the other end through a center opening 57 in the enlargment 52. See Figures 11, 12, 13 and 15.

The bottom of the partition wall 47 and the bottom of the reservoir body 45 present flat faces 58 in a common plane and the body 45 also has two enlargments or bosses 59 which are tapped at 60 to receive assembly securing screws. The parallel reservoir chambers 48 open downwardly through bottom openings 61 in the manner clearly illustrated in Figures 11 and 14.

The casting 43 includes two parallel cylinders 62 connected by a web 63 and each bored as at 64 to receive the usual reciprocating piston 65 equipped with the usual cups 66. It will be noted by reference to Figures 12 and 13 of the drawings that the pistons are recessed at their ends as at 67 for engagement by actuator devices to be described hereinafter and which serve to apply brake fluid discharging movement to the pistons. The return movement is imparted to the pistons in the usual manner by compression springs 68 which are interposed between the advance ends of the pistons and the threadably mounted and apertured end plugs 69 secured in the delivery ends of the cylinders.

The central web or wall 63 of the casting 43 is cored out as at 70 to provide passages for brake fluid between the reservoir chamber 48 and the outlets 61, and the fluid chambers below the cylinders in the manner clearly illustrated in Figures 12, 14 and 17. Enlargements or bosses 71 in the casting 43 are bored as at 72 for receiving the assembly securing screws as will be apparent by reference to Figure 17, and this view also clearly illustrates the wedge shaped openings 73 through the bottom of the cylinder and which serve as inlet and escape ports, the small or restricted portions of the ports being directed toward the discharge ends of the cylinders. See also Figures 13 and 14. It has been found that these wedge shaped ports feed and release the brake fluid more rapidly and thereby provide for faster, more efficient action, and this type of port also is found quite desirable because of being substantially non-clogging.

The cylinder connecting web and also the top and bottom surfaces of the intermediate or cylinder casting 43 are provided with flat surfaces 74 for matching with and opposing like surfaces on the top section 42 and the bottom section 44.

The matching flat surface on the bottom casting 44 is designated 75 and said casting also includes a center rib 76 having a top flat surface in the same plane as the surface 75 for opposing the central web 63. The bottom casting also includes enlargements or bosses 77 which are bored as at 78 to receive the assembly securing screws 79. It will be noted by reference to Figures 9, 11 and 14 that two such screws are all that are needed to maintain the secure assembly of the component casting parts 42, 43, and 44. As in the previously described form of the invention, ring gaskets 80 are interposed between the opposing flat faces of the several casting parts, and the bottom casting is provided with a bottom or closure wall 81 which completes the sediment trap chambers. It will be apparent by reference to Figure 14 that an individual reservoir chamber and seidment trapping chamber connected between passages 70 is associated with each of the cylinders 62.

A closure plate 82 is secured as at 83 over the open ends of the cylinders 62 in the manner clearly illustrated in Figures 9 and 11 to 13, and said plate is provided with apertures 84 which are aligned with the axes of the cylinder bores. It will be apparent that when the intermediate or cylinder casting 43 is removed from the assembly, the closure plate 82 will be removed with this casting unit.

Within the slide chamber 54 a cup-like elongated slide 85 is reciprocably mounted, said slide having a boss extension 86 which may extend into the opening 57 in the mounting flange or enlargement 52 of the main body or reservoir casting unit 42. The extension 86 is recessed as at 87 to receive a central, brake actuator generally designated 88. It is to be understood that any acceptable form of brake actuating devices may be employed for imparting the desired brake applying movement to the slide 85.

A fulcrum plate 89 is mounted in the bottom of the recess in the cup-like slide 85 in the manner clearly illustrated in Figures 12 and 13, and said plate is provided with a central, upright fulcrum rib 90 which is engaged in a V-groove 91 formed in an equalizer bar 92 which is rockably mounted within the slide recess. The equalizer bar has two cone seats 93 one thereof being provided adjacent each end thereof, and the cone heads 94 of a pair of plunger pins 95 engage in said cone seats. It will be apparent by reference to Figure 12 that the pins 95 are arranged in parallel spaced relation with their axes aligned with the axes of the cylinder bores 64 and the pistons 65 therein, and said pins are equipped at their advance ends with rounded portions engaging in the seats 67 formed in the ends of the pistons. The pin heads are retained in the equalizer bar recesses or seats 93 by snap rings, and the equalizer bar is retained in the slide recess by a cross pin 97. Apertures 98 formed in the slide 85 open communication between the interior of the slide and the upper and lower slideway recesses 56 and 55, and these devices serve to facilitate lubrication of the moving parts through the medium of lubricating grease which may be packed into said recesses.

It will be apparent by reference to the drawings that whenever it is desired to remove the cylinder casting 43 for the purpose of overhauling or replacing the same, it is only necessary to remove the two assembly securing screws 79, and this can be accomplished without disturbing the rigid mounting of the main body casting unit 42.

As before stated, the brake fluid supplied in the chambers 48 communicates through the openings 61 and 70 with the chambers beneath the cylinders and in the bottom casting unit 44 and enters the cylinders and is permitted to escape therefrom through the wedge shaped ports 73.

When pressure is applied to the slide 85 through the actuator device 88, the slide is moved to the left as viewed in Figure 12, and the pins 95 serve to move the pistons 65 to the left and cause them to displace brake fluid from the lefthand ends of the cylinders 62. The equalizer bar 92 serves to equalize the thrust application to the cylinders in the usual manner, and when the pressure on the slide 85 is released by retraction of the actuator device 88, the springs 68 serve to return the pistons 65 in the usual manner.

While example forms of the invention have been shown for purposes of illustration, it is to be clearly understood that various changes in the details of construction and arrangement of parts may be made without departing from the spirit and scope of the invention as defined in the appended claims.

I claim:

1. A master brake cylinder structure for use in hydraulic brake systems and comprising, a top main reservoir unit having a reservoir chamber and a filler cap through which said chamber can be filled with brake fluid and a bracket extension adapted to be rigidly secured to a support, an intermediate cylinder unit having a cylinder, and a bottom unit providing a sediment collecting chamber beneath the cylinder, means affording fluid communication between said reservoir chamber and said collecting chamber, inlet and escape ports opening from the cylinder for communication with the fluid, and means for removably securing said three units in assembly relation.

2. A master brake cylinder structure for use in hydraulic brake systems and comprising, a top main reservoir unit having a reservoir chamber and a filler cap through which said chamber can be filled with brake fluid and a bracket extension adapted to be rigidly secured to a support, an intermediate cylinder unit having a cylinder, and a bottom unit providing a sediment collecting chamber beneath the cylinder, means affording fluid communication between said reservoir chamber and said collecting chamber, inlet and escape ports opening from the cylinder downwardly into said collecting chamber, and means for removably securing said three units in assembly relation.

3. A master brake cylinder structure for use in hydraulic brake systems and comprising, a top main reservoir unit having a reservoir chamber and a filler cap through which said chamber can be filled with brake fluid and a bracket extension adapted to be rigidly secured to a support, an intermediate cylinder unit having a cylinder, and a bottom unit providing a sediment collecting chamber beneath the cylinder, means affording fluid communication between said reservoir chamber and said collecting chamber, inlet and escape ports opening from the cylinder for communication with the fluid, said units having aligned bores and taps in which to receive two unit assembly securing screws, and two screws serving as the sole means for removably holding said units in assembly.

4. A master brake cylinder structure for use in hydraulic brake systems and comprising, a top main reservoir unit having a reservoir chamber and a filler cap through which said chamber can be filled with brake fluid and a bracket extension adapted to be rigidly secured to a support, an intermediate cylinder unit having a cylinder, and a bottom unit providing a sediment collecting chamber beneath the cylinder, said units having complementary flat meeting faces and sealing gaskets between said meeting faces, and said top and intermediate units having communicating passages therein through which fluid from the reservoir chamber can flow past the cylinder down into the bottom unit chamber, inlet and escape ports opening from the cylinder downwardly into said bottom unit chamber, and means for removably securing said three units in assembly.

5. A master brake cylinder structure for use in hydraulic brake systems and comprising a top main reservoir unit having a reservoir chamber and a filler cap through which said chamber can be filled with brake fluid and a bracket extension adapted to be rigidly secured to a support, an intermediate cylinder unit having a cylinder, and a bottom unit providing a sediment collecting chamber beneath the cylinder, said units having complementary flat meeting faces and sealing gaskets between said meeting faces, and said top and intermediate units having communicating passages therein through which fluid from the reservoir chamber can flow past the cylinder down into the bottom unit chamber, inlet and escape ports opening from the cylinder downwardly into said bottom unit chamber, said units having aligned bores and taps in which to receive two unit assembly securing screws, and two screws serving as the sole means for removably holding said units in assembly.

6. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinder, means affording fluid communication between said reservoirs and said collecting chamber, inlet and escape ports in each cylinder for communication with the fluid, and means for removably securing said three units in assembly relation.

7. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinder, means affording fluid communication between said reservoirs and said collecting chamber, inlet and escape ports in each cylinder opening downwardly into said collecting chamber, and means for removably securing said three units in assembly relation.

8. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinder, means affording fluid communication between said reservoirs and said collecting chamber, inlet and escape ports in each cylinder opening downwardly into said collecting chamber, and constituting elongated wedge shaped openings through the cylinder walls with the small ends directed toward the discharge ends of the cylinders, and means for removably securing said three units in assembly relation.

9. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinder, means affording fluid communication between said reservoirs and said collecting chamber, inlet and escape ports in each cylinder opening downwardly into said collecting chamber, said units having aligned bores and taps in which to receive two unit assembly securing screws, and two screws serving as the sole means for removably holding said units in assembly.

10. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinders, said units having complementary flat meeting faces and sealing gaskets between said meeting faces, and said top and intermediate units having communicating passages therein through which fluid from the reservoir chamber can flow between the cylinders down into the bottom unit chamber, inlet and escape ports opening from the cylinder downwardly into said bottom unit chamber, and means for removably securing said three units in assembly relation.

11. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinders, said units having complementary flat meeting faces and sealing gaskets between said meeting faces, and said top and intermediate units having communicating passages therein through which fluid from the reservoir chamber can flow between the cylinders down into the bottom unit chamber, inlet and escape ports opening from the cylinder downwardly into said bottom unit chamber, and means for removably securing said three units in assembly relation, and said bottom unit having a partition therein dividing the sediment collecting chamber into two chambers each of which is individual to one cylinder and one main reservoir chamber.

12. A master brake cylinder structure for use in hydraulic brake systems and comprising, a top main reservoir unit having two parallel longitudinal reservoir chambers divided by a partition wall and including also a filler cap through which both said chambers can be filled with brake fluid, said wall being partially cut away beneath said cap and said unit also having a bracket extension adapted to be rigidly secured to a support, an intermediate cylinder unit having two parallel cylinders, and a bottom unit providing a sediment collecting chamber beneath the cylinders, said units having complementary flat meeting faces and sealing gaskets between said meeting faces, and said top and intermediate units having communicating passages therein through which fluid from the reservoir chamber can flow between the cylinders down into the bottom unit chamber, inlet and escape ports opening from the cylinder downwardly into said bottom unit chamber, said units having aligned bores and taps in which to receive two unit assembly securing screws, and two screws serving as the sole means for removably holding said units in assembly.

13. A master brake cylinder structure for use in hydraulic brake systems and comprising, a top main reservoir unit having a reservoir chamber therein and a filler cap through which said chamber can be filled with brake fluid and a bracket extension adapted to be rigidly secured to a support, an intermediate cylinder unit having two parallel cylinders and terminating at one end in a right angled end portion, and said main unit also having a guide extension merging into said bracket extension and forming with the remainder of said main unit a right angled seat in which to receive said right angled end portion, piston means in said cylinders, actuator devices housed in said guide extension and engaging with said piston means, and a bottom unit providing a sediment collecting chamber beneath the cylinders, means affording fluid communication between said reservoir and collecting chamber, inlet and escape ports opening downwardly from said cylinders into said collecting chamber, and means for removably securing said three units in assembly relation.

14. A master brake cylinder structure for use in hydraulic brake systems and comprising, a top main reservoir unit having a reservoir chamber therein and a filler cap through which said chamber can be filled with brake fluid and a bracket extension adapted to be rigidly secured to a support, an intermediate cylinder unit having two parallel cylinders and terminating at one end in a right angled end portion, and said main unit also having a guide extension merging into said bracket extension and forming with the remainder of said main unit a right angled seat in which to receive said right angled end portion, piston means in said cylinders, actuator devices housed in said guide extension and engaging with said piston means, and a bottom unit providing a sediment collecting chamber beneath the cylinders, said units having complementary flat meeting faces and sealing gaskets between said meeting faces, and said top and intermediate units having communicating passages therein through which fluid from the reservoir chamber can flow between the cylinders down into the bottom unit chamber, inlet and escape ports opening downwardly from said cylinders into said collecting chamber, and means for removably securing said three units in assembly relation.

15. Master cylinder structure as defined in claim 13 in which the actuator devices include a guided cup-like slide having a fulcrum rib therein, an equalizer bar rockably engaging said rib and having a fulcrum seat adjacent each end, and a piston pusher pin engaging each said seat and extending forwardly into one of the cylinders and engaging the piston therein at its axis.

16. Master cylinder structure as defined in claim 13 in which a closure plate is removably secured across the cylinders at the right angled end of the intermediate unit so as to be removable with the intermediate unit during disassembling of the master cylinder structure.

ALEXANDER BLACKMAN.

REFERENCES CITED

The following references are of record in the file of this patent:

UNITED STATES PATENTS

| Number | Name | Date |
|---|---|---|
| 2,154,817 | Leighton | Apr. 18, 1939 |